United States Patent
Ou et al.

(10) Patent No.: US 11,852,216 B2
(45) Date of Patent: Dec. 26, 2023

(54) TRANSMISSION SYSTEM OF DECELERATING MECHANISM

(71) Applicant: TIEN HSIN INDUSTRIES CO., LTD., Taichung (TW)

(72) Inventors: Ming-Lan Ou, Taichung (TW); Tsung-Ming Tsai, Taichung (TW); Yu-Nong Wu, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 18/111,615

(22) Filed: Feb. 20, 2023

(65) Prior Publication Data
US 2023/0272841 A1    Aug. 31, 2023

(30) Foreign Application Priority Data
Feb. 25, 2022   (TW) .................................. 111201981

(51) Int. Cl.
*F16H 57/08* (2006.01)
*F16H 1/28* (2006.01)
*F16H 1/32* (2006.01)

(52) U.S. Cl.
CPC ............ *F16H 1/2863* (2013.01); *F16H 1/32* (2013.01); *F16H 2001/327* (2013.01); *F16H 2057/085* (2013.01); *F16H 2200/20* (2013.01)

(58) Field of Classification Search
CPC .... F16H 1/2863; F16H 1/32; F16H 2001/327; F16H 2200/20; F16H 2057/085
See application file for complete search history.

(56) References Cited

U.S. PATENT DOCUMENTS 5,554,082 A * 9/1996 Umeyama ................ F16H 1/46
74/462

FOREIGN PATENT DOCUMENTS

| CN | 109878629 A | * | 6/2019 | | |
| DE | 102019121079 B3 | * | 11/2020 | ........... | F16H 37/082 |
| EP | 3767131 A1 | * | 1/2021 | ............. | F02C 3/06 |
| EP | 3859134 A1 | * | 8/2021 | ............. | B64C 11/46 |
| JP | 2017180811 A | * | 10/2017 | | |
| WO | WO-2021086179 A1 | * | 5/2021 | ............. | F03D 15/00 |

* cited by examiner

*Primary Examiner* — Justin Holmes
(74) *Attorney, Agent, or Firm* — Apex Juris, pllc; Hilde Coeckx

(57) ABSTRACT

A transmission system of a decelerating mechanism includes a planetary gear unit including a sun gear being adjacent to the first surface and a planetary gear set and a holder including a carrier and several planetary shaft units rotatably disposed on the carrier. The carrier has a first surface and a second surface that face opposite directions. The planetary gear set has several first gears being adjacent to the first surface, respectively fitting around the planetary shaft units, and meshing with the sun gear, several second gears being adjacent to the second surface and being coaxially disposed with the first gears, and an internal gear ring meshing with the second gears. By respectively arranging the first gears and the second gears on two opposite sides of the carrier, mutual interference therebetween while turning could be avoided, and an overall volume of the transmission system could be reduced.

3 Claims, 9 Drawing Sheets

TRANSMISSION SYSTEM OF DECELERATING MECHANISM

BACKGROUND OF THE INVENTION

Technical Field

The present disclosure is related to a decelerating mechanism, and more particularly to a transmission system of a decelerating mechanism.

Description of Related Art

A transmission system 1 of a conventional decelerating mechanism is illustrated in FIG. 1 to FIG. 3, wherein the decelerating mechanism includes a casing (not shown), a supporting shaft (not shown) penetrating through the casing along an axis L, and a motor rotor (not shown) located in the casing for being driven to turn around the supporting shaft. The transmission system 1 of the conventional decelerating mechanism is located in the casing and includes a holder 11 fixedly fitting around the supporting shaft, a sun gear 12 rotatably fitting around the supporting shaft and connected to the motor rotor to be driven by the motor rotor to turn around the axis L, an abutting member 13 abutting between the holder 11 and the sun gear 12, and a planetary gear set 14 rotatably disposed on the holder 11 and connected to the casing. The holder 11 has a carrier 111 fixedly fitting around the supporting shaft for the sun gear 12 to be rotatably disposed thereon, three first planetary shafts 112 disposed on the carrier 111 at intervals around the axis L, and three second planetary shafts 113 disposed on the carrier 111 at intervals around the axis L and respectively located between any two of the first planetary shafts 112, wherein the first planetary shafts 112 are closer to the sun gear 12 than the second planetary shafts 113. The planetary gear set 14 has three first gears 141 respectively and rotatably disposed on the first planetary shafts 112, being adjacent to the carrier 111, and meshing with the sun gear 12, three second gears 142 respectively and rotatably disposed on the first planetary shafts 112, respectively located on a side of the first gears 141 away from the carrier 111, and respectively and correspondingly being coaxial with the first gears 141, three third gears 143 respectively and rotatably disposed on the second planetary shafts 113 and respectively meshing with the second gears 142, three fourth gears 144 respectively and rotatably disposed on the second planetary shafts 113, respectively located on a side of the third gears 143 adjacent to the carrier 111, and respectively and correspondingly being coaxial with the third gears 143, and an internal gear ring 145 meshing with the fourth gears 144 and connected to the casing to drive the casing to turn. In this way, the motor rotor drives the sun gear 12 to rotate around the axis L, and the sun gear 12 drives the first gears 141 to turn; the second gears 142 coaxially turn while the first gears 141 turn, and the second gears 142 respectively drive the third gears 143 to turn; the fourth gears 144 coaxially turn while the third gears 143 turn, and the fourth gears 144 drive the internal gear ring 145 to turn to drive the casing to turn.

However, when the first gears 141 and the fourth gears 144 adjacent to the carrier 111 turn, a gap D1 must be reserved between each of the first gears 141 and the carrier 111, and a gap D2 must be reserved between each of the fourth gears 144 and the carrier 111 for avoiding interference with the carrier 111; when the second gears 142 turn, a gap D3 must be reserved between each of the second gears 142 and the sun gear 12 for avoiding interference with the sun gear 12; when the first gears 141 turn, a gap D4 must be reserved between each of the first gears 141 and corresponding one of the third gears 143 for avoiding interference with the third gears 143; when the third gears 143 turn, a gap D5 must be reserved between each of the third gears 143 and the internal gear ring 145 for avoiding interference with the internal gear ring 145. The aforementioned gaps lead to an increase in the required lengths of both the first planetary shafts 112 and the second planetary shafts 113, wherein as the lengths of the first planetary shafts 112 and the second planetary shafts 113 increase, the shaking and the deflection of the planetary gear set 14 when rotating are also greater, and more safety distances should be reserved, so that the length of the transmission system of the conventional decelerating mechanism is overall longer in the axis L, and the casing requires a larger receiving space, resulting in a larger overall volume of the conventional decelerating mechanism.

BRIEF SUMMARY OF THE INVENTION

In view of the above, the purpose of the present disclosure is to provide a transmission system of a decelerating mechanism, which could effectively solve the aforementioned problems.

The inventive subject matter provides a transmission system of a decelerating mechanism, including a holder and a planetary gear unit. The holder includes a carrier surrounding an axis and a plurality of planetary shaft units penetrating through the carrier along an axial direction parallel to the axis to be rotatably disposed on the carrier, wherein the carrier has a first surface and a second surface that face opposite directions in the axis. The planetary gear unit includes a sun gear and a planetary gear set, wherein the sun gear is adjacent to the first surface and is adapted to rotate around the axis. The planetary gear set has a plurality of first gears adjacent to the first surface and respectively fitting around the planetary shaft units to mesh with the sun gear, a plurality of second gears adjacent to the second surface and respectively fitting around the planetary shaft units to be respectively and correspondingly being coaxial with the plurality of first gears, and an internal gear ring surrounding the axis and meshing with the plurality of second gears. Each of the plurality of first gears turns coaxial with one of the plurality of second gears, and the plurality of second gears drive the internal gear ring to turn.

With the aforementioned design, mutual interference between the first gears and the second gears could be avoided by respectively arranging the first gears and the second gears on opposite sides of the carrier along the axis, and the gaps should be reserved only between the first gears and the carrier and between the second gears and the carrier, thereby the required length of the planetary shafts in the axial direction could be greatly reduced, reducing the overall volume of the transmission system of the decelerating mechanism and greatly improving the shaking and the deflection generated when the planetary gear set running.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
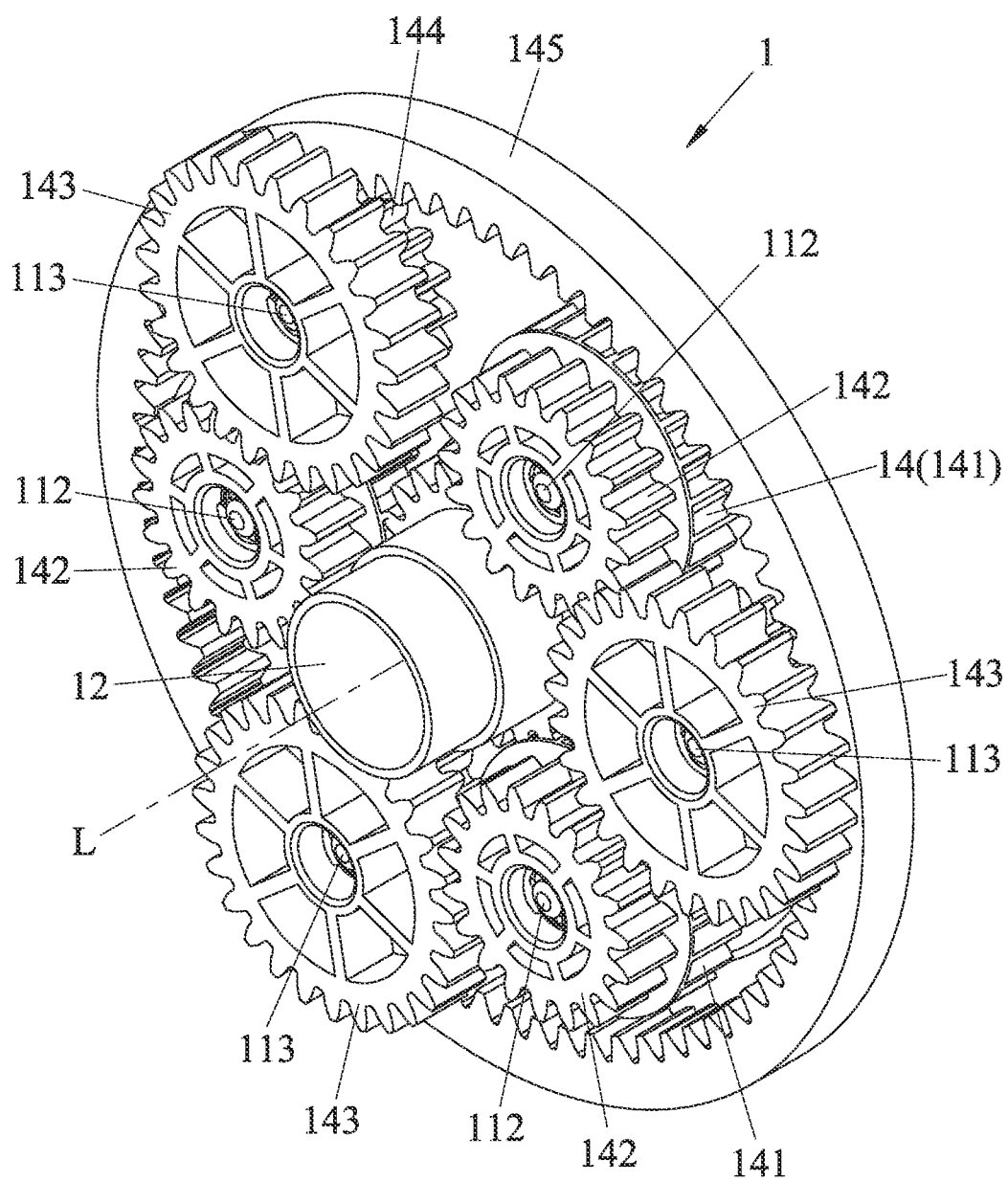
FIG. 1 is a perspective view of the transmission system of the conventional decelerating mechanism.
Figure 2:
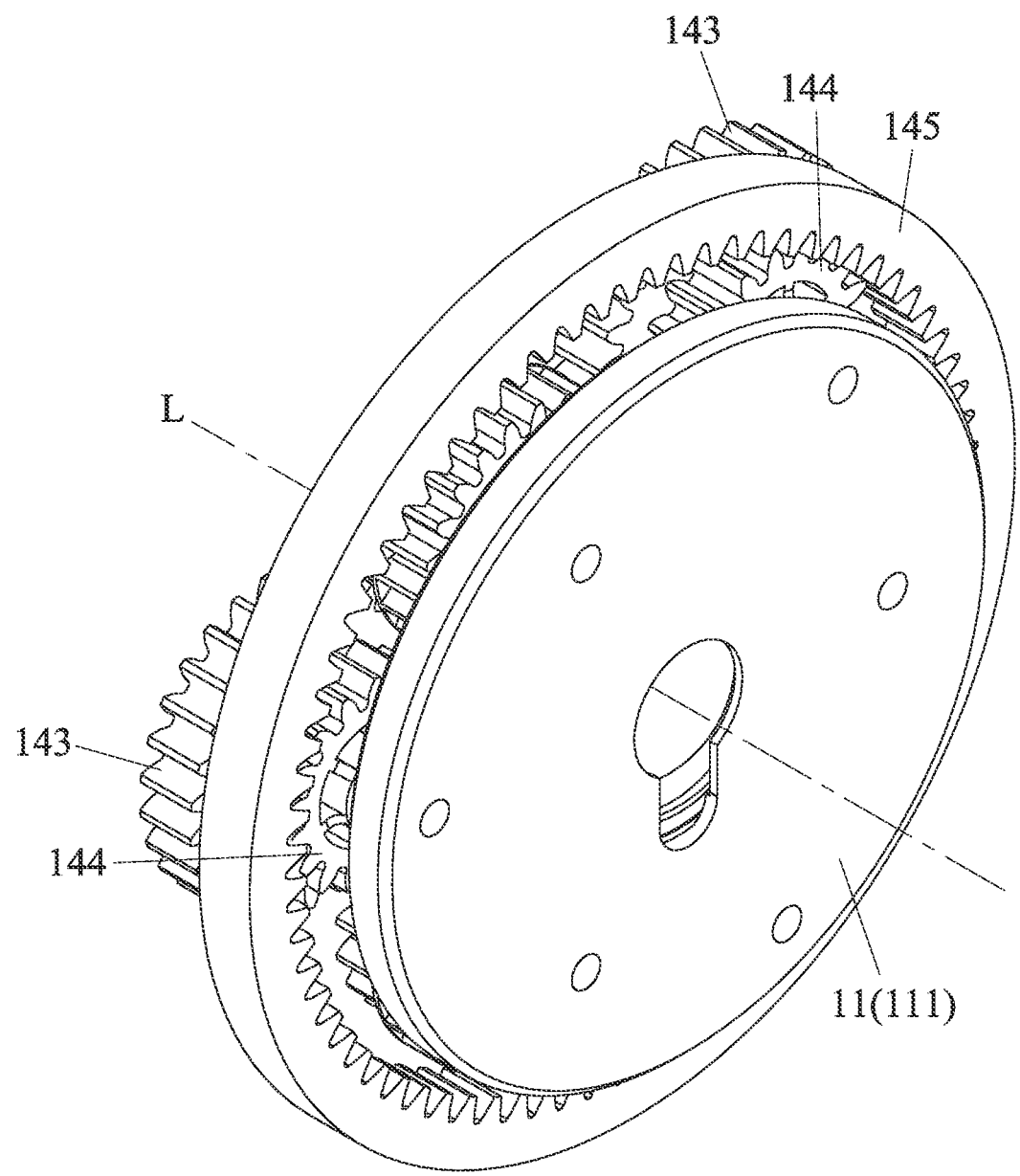
FIG. 2 is a perspective view of the transmission system of the conventional decelerating mechanism seen from another direction.
Figure 3:
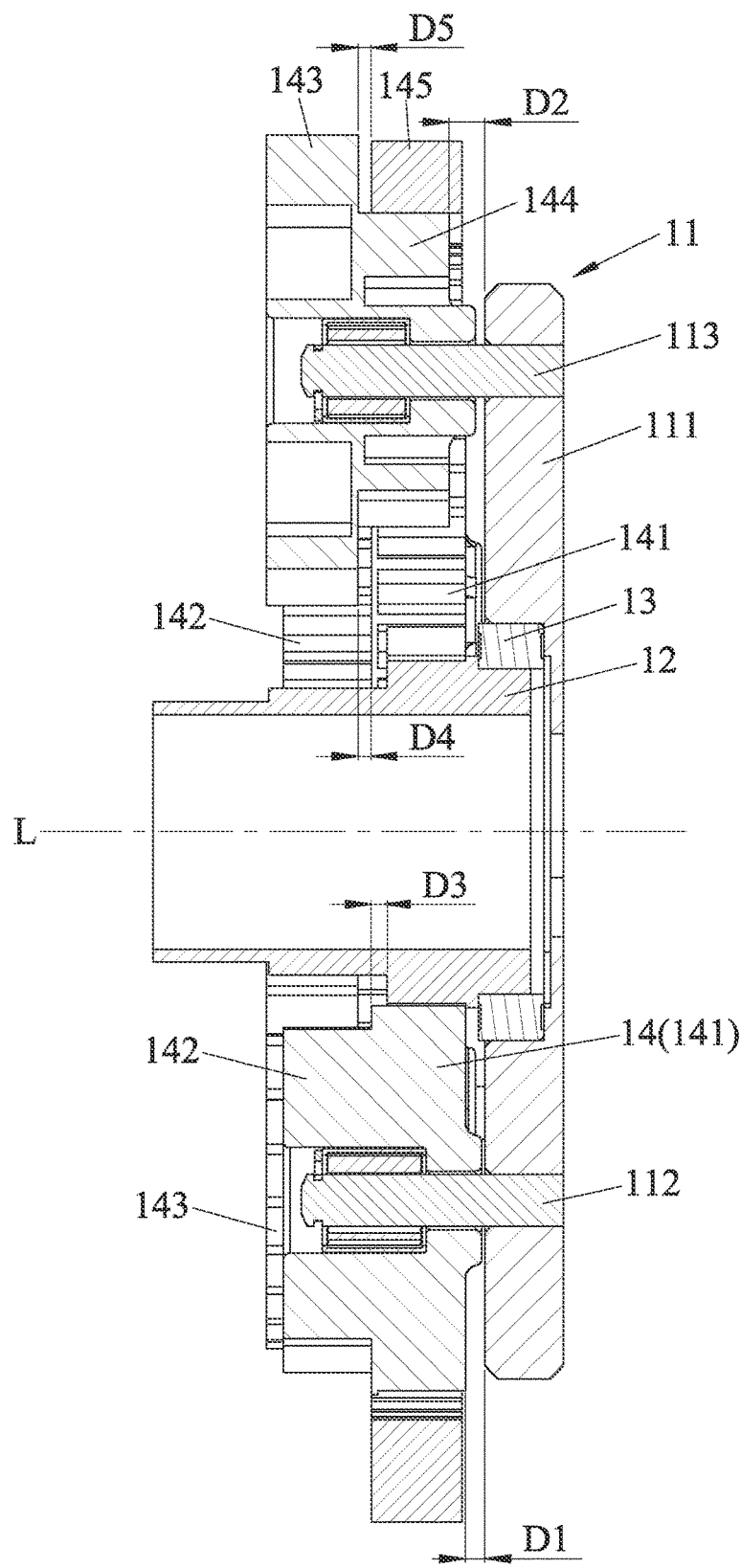
FIG. 3 is a sectional view of the transmission system of the conventional decelerating mechanism.
Figure 4:
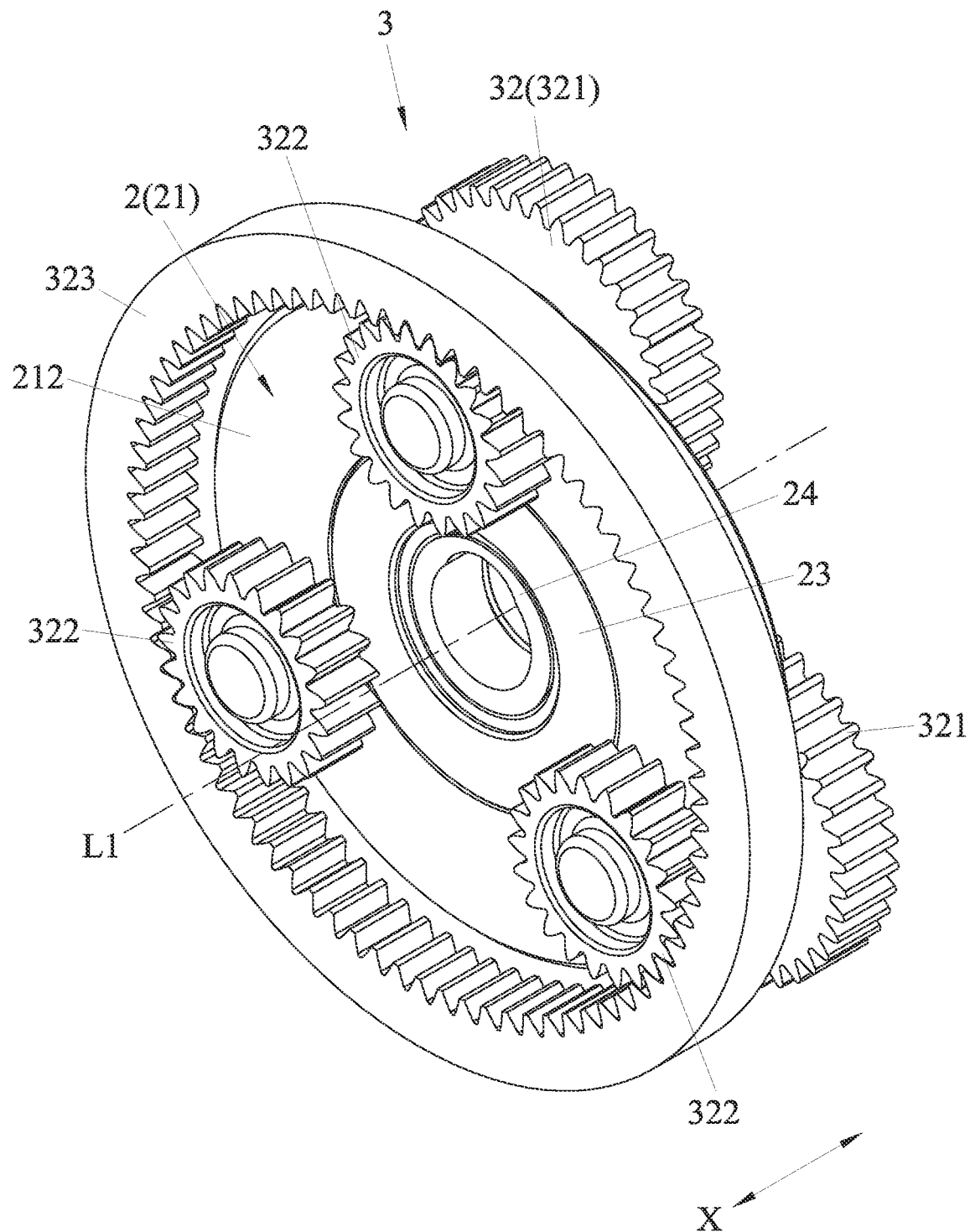
FIG. 4 is a perspective view of the transmission system of the decelerating mechanism according to an embodiment of the present disclosure.
Figure 5:
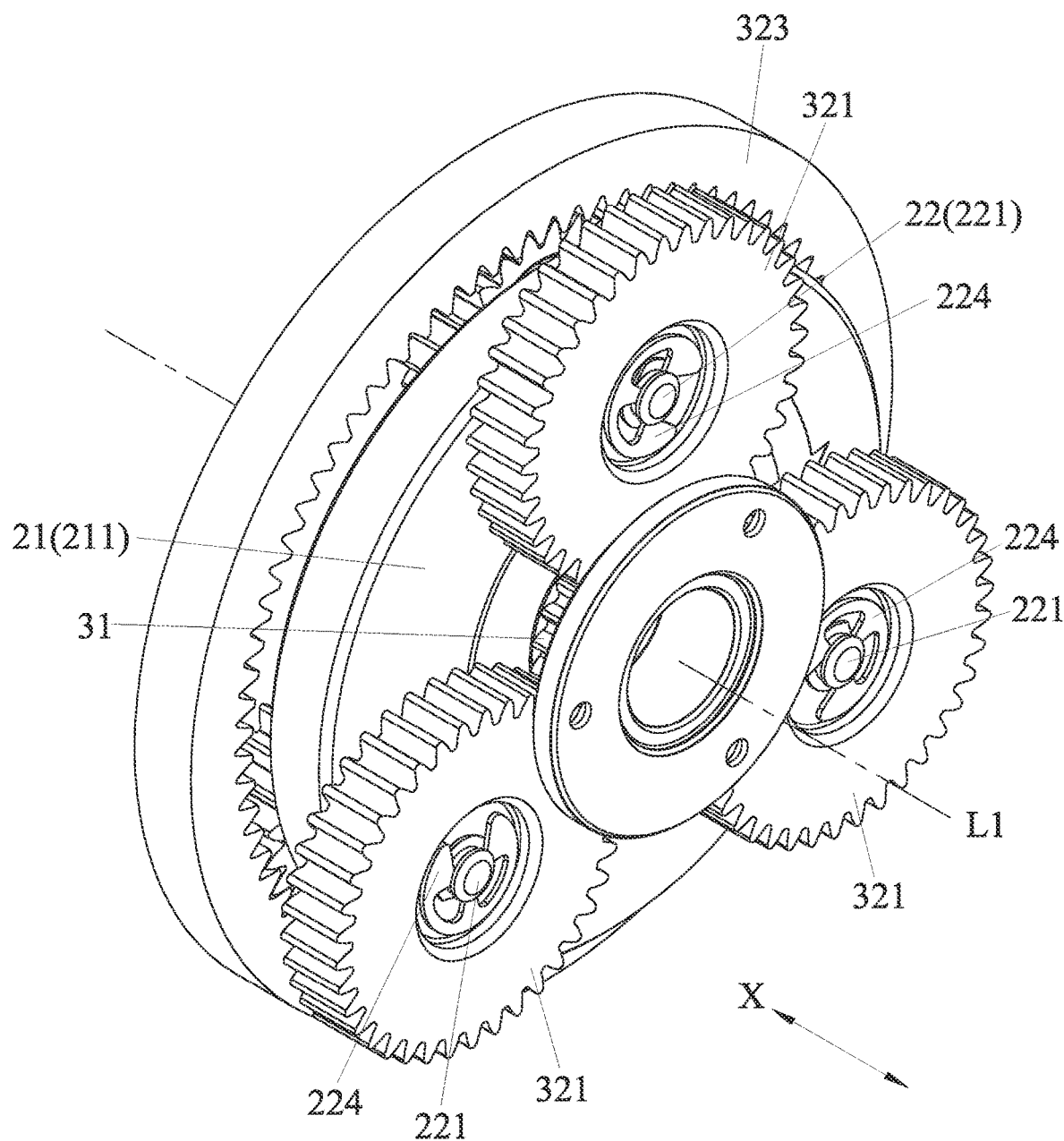
FIG. 5 is a perspective view of the transmission system of the decelerating mechanism according to the embodiment of the present disclosure seen from another direction.

A transmission system of a decelerating mechanism according to an embodiment of the present disclosure is illustrated in FIG. 4 and FIG. 5, wherein the decelerating mechanism includes a supporting shaft (not shown) extending along an axis L1, a casing (not shown) that is adapted to be passed through by the supporting shaft and is rotatable relative to the supporting shaft, and a motor rotor (not shown) located in the casing for being driven to turn relative to the supporting shaft. The transmission system of the decelerating mechanism is located in the casing and includes a holder 2 and a planetary gear unit 3.

Figure 6:
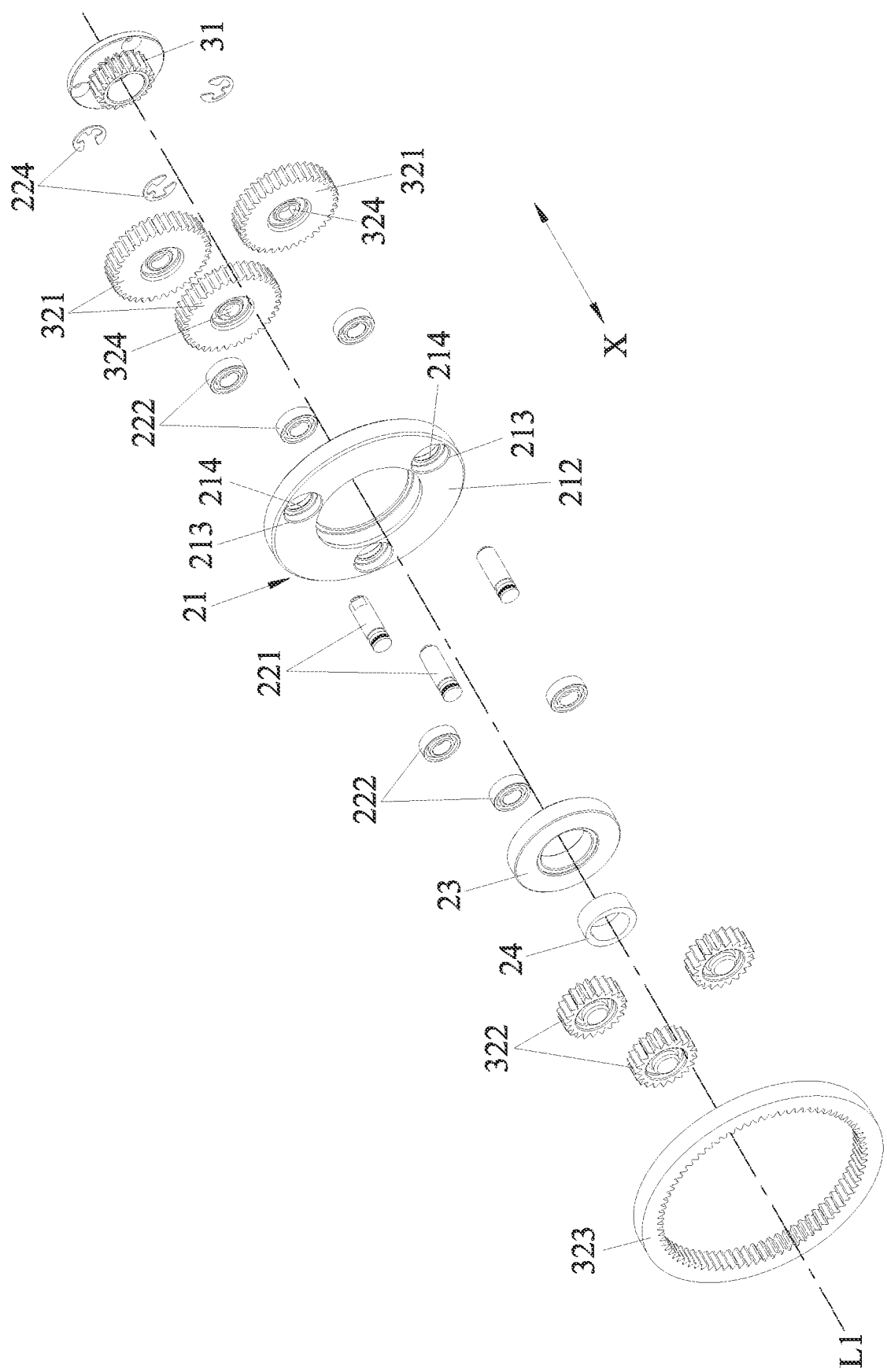
FIG. 6 is an exploded perspective view of the transmission system of the decelerating mechanism according to the embodiment of the present disclosure.
Figure 7:
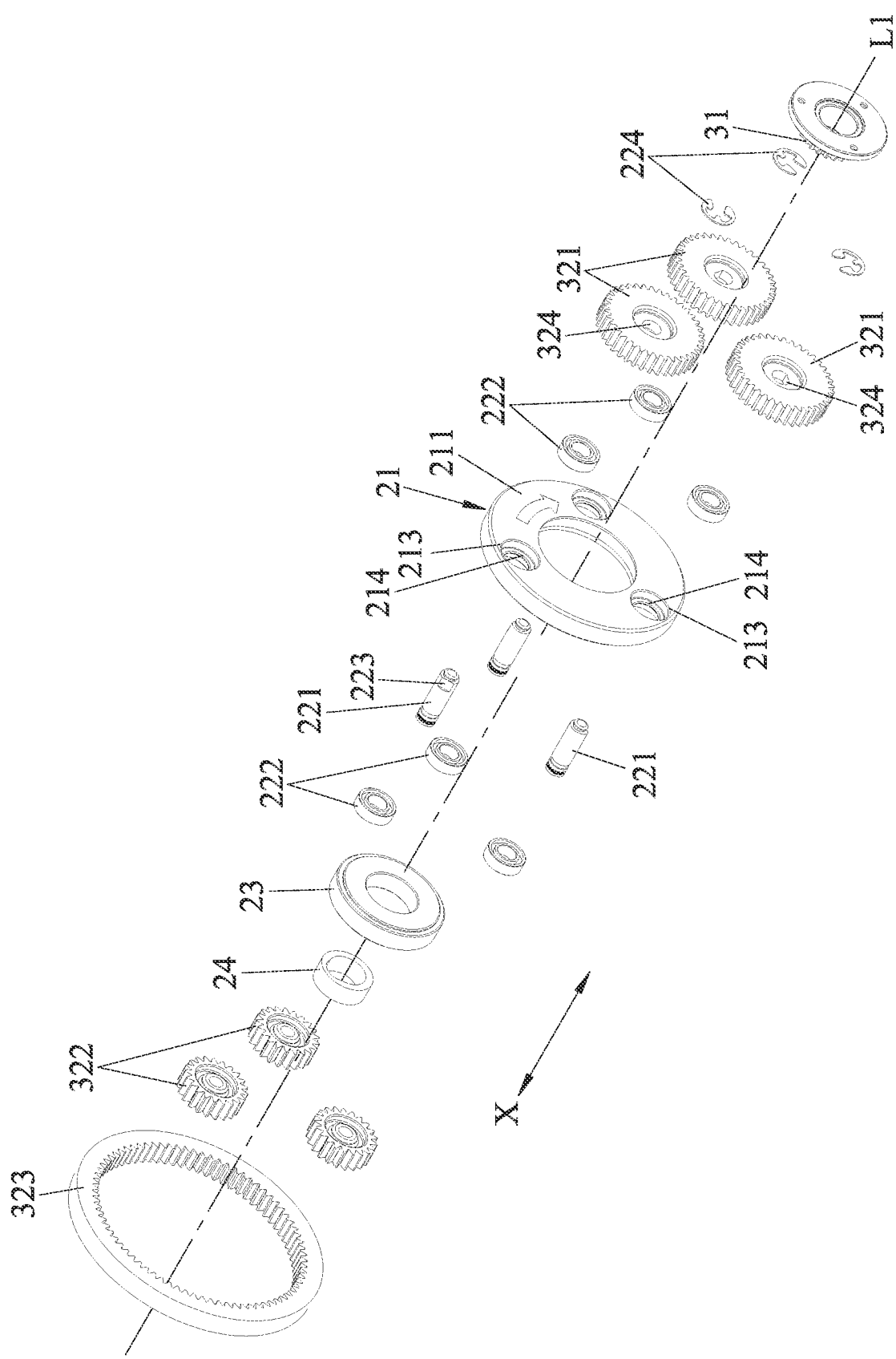
FIG. 7 is an exploded perspective view of the transmission system of the decelerating mechanism according to the embodiment of the present disclosure seen from another direction.
Figure 8:
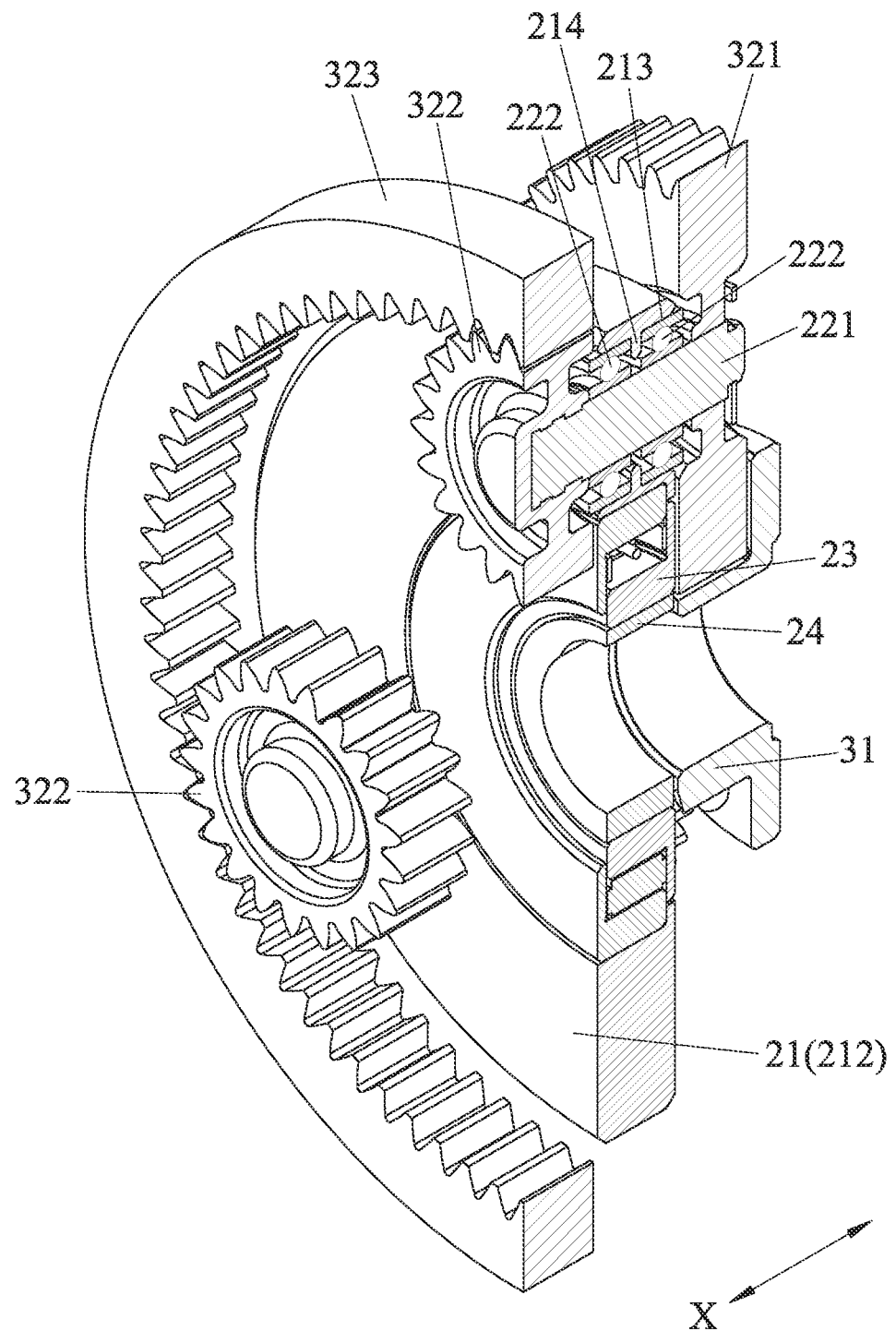
FIG. 8 is a sectional perspective view of the transmission system of the decelerating mechanism according to the embodiment of the present disclosure.
Figure 9:
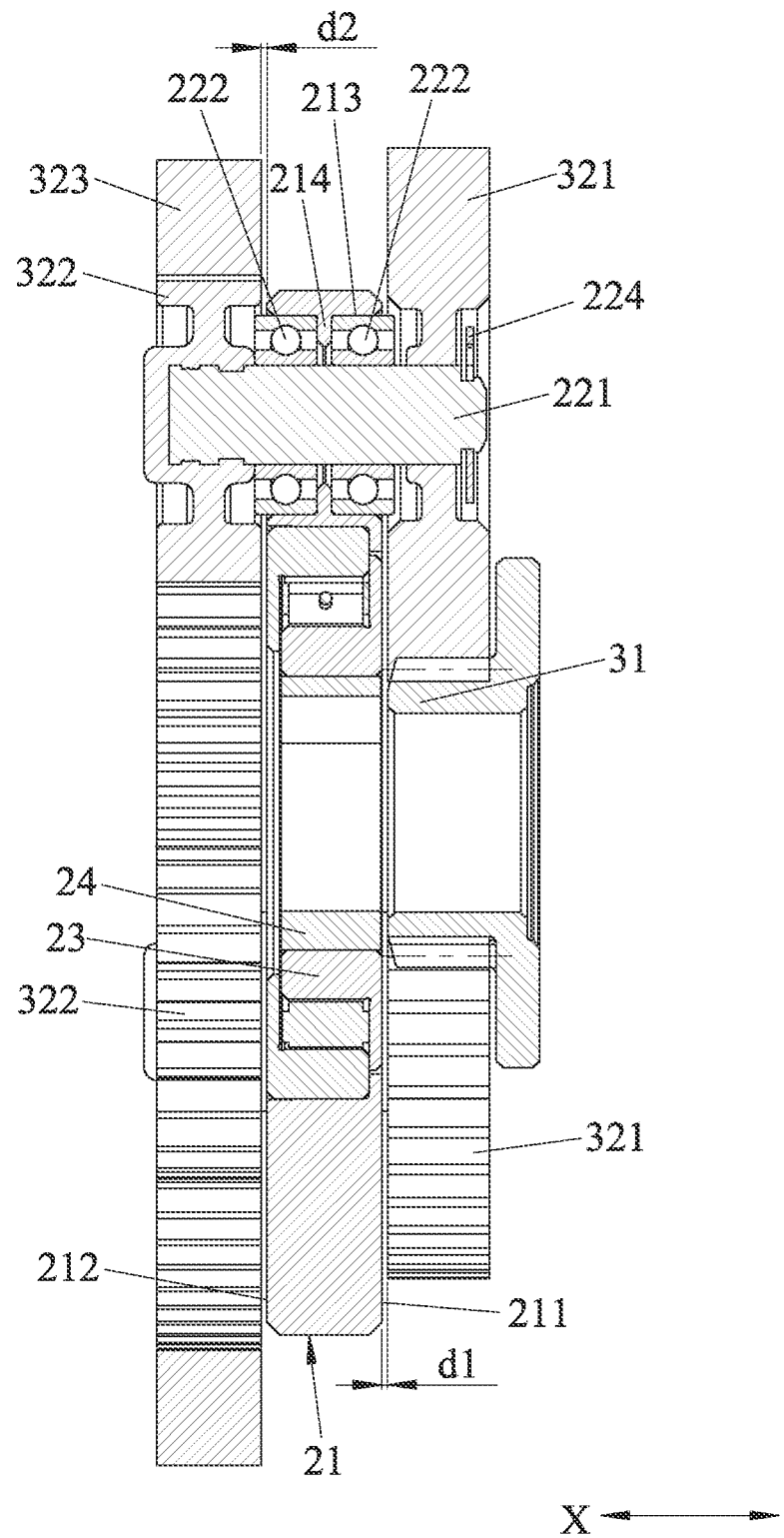
FIG. 9 is a side-sectional view of the transmission system of the decelerating mechanism according to the embodiment of the present disclosure.

Referring to FIG. 5 to FIG. 7, the holder 2 includes a carrier 21 that is annular and disposed around the axis L1, three planetary shaft units 22 respectively penetrating through the carrier 21 along an axial direction X parallel to the axis L1 to be rotatably disposed on the carrier 21, a one-way bearing ring 23 fixed to an inner peripheral surface of the carrier 21, and a sleeve 24 abutting against an inner peripheral surface of the one-way bearing ring 23 and fitting around the supporting shaft.

Referring to FIG. 6 to FIG. 9, the carrier 21 has a first surface 211 and a second surface 212 that face opposite directions along the axis L1, three through holes 213 penetrating through both the first surface 211 and the second surface 212 along the axial direction X and arranged at regular intervals around the axis L1 for being passed through by the planetary shaft units 22 respectively, and three annular ribs 214 respectively protruding inward from an inner peripheral surface of the through holes 213. The planetary shaft units 22 respectively penetrate through the through holes 213 along the axial direction X, and each of the planetary shaft units 22 has a planetary shaft 221 penetrating through one of the through holes 213 along the axial direction X and two planetary bearings 222 fitting around the planetary shaft 221 and fitting into one of the through holes 213, wherein the planetary bearings 222 allow each of the planetary shafts 221 to smoothly turn in one of the through holes 213. However, the number of the planetary bearing 222 of each of the planetary shaft units 22 is not a limitation of the present disclosure, but could be one in other embodiments, which could allow each of the planetary shafts 221 to smoothly turn in one of the through holes 213 as well. Each of the annular ribs 214 is adapted to separate the planetary bearings 222 in one of the through holes 213, avoiding wear and tear caused by the contact between the planetary bearings 222. An end of each of the planetary shafts 221 adjacent to the first surface 211 in the axial direction X has a restricting portion 223 (shown in FIG. 7) that is D-shaped and a buckle 224 buckled on an end of the restricting portion 223 away from the first surface 211. In the current embodiment, the buckle 224 is a C-shaped buckle as an example.

The planetary gear unit 3 includes a sun gear 31 and a planetary gear set 32, wherein the sun gear 31 being adjacent to the first surface 211 fits around the supporting shaft and is driven by the motor rotor to turn relative to the supporting shaft. The planetary gear set 32 has three first gears 321 being adjacent to the first surface 211, respectively disposed on the planetary shafts 221, and meshing with the sun gear 31, three second gears 322 being adjacent to the second surface 212, respectively disposed on the planetary shafts 221, and being coaxial with the first gears 321, and an internal gear ring 323 surrounding the axis L1, meshing with the second gears 322, and connected to the casing to drive the casing to turn relative to the supporting shaft. A gap d1 is formed between each of the first gears 321 and the first surface 211 of the carrier 21 to avoid interference between the first gears 321 and the carrier 21. A gap d2 is formed between each of the second gears 322 and the second surface 212 of the carrier 21 to avoid interference between the second gears 322 and the carrier 21. Each of the first gears 321 has a restricting hole 324 that is D-shaped and corresponds to the restricting portion 223 of one of the planetary shafts 221, and the restricting portion 223 of each of the planetary shafts 221 passes through the restricting hole 324 of one of the first gears 321 to fixedly connect each of the first gears 321 and one of the planetary shafts 221 through one of the buckle 224. Each of the second gears 322 is formed on an end of one of the planetary shafts 221 opposite to the corresponding first gear 321 by overmolding, thereby fixedly connected to the planetary shafts 221. However, a way that the second gears 322 fixedly connected to the planetary shafts 221 is not a limitation of the present disclosure, but could be achieved by using the way that the first gears 321 fixedly connected to the planetary shafts 221.

The procedure of the transmission system of the decelerating mechanism is as follows: the motor rotor is driven to drive the sun gear 31 to turn relative to the supporting shaft, and the sun gear 31 drives the first gears 321 to turn; the second gears 322 coaxially turn while the first gears 321 turn, and the second gears 322 drive the internal gear ring 323 to turn; the internal gear ring 323 drives the casing to turn relative to the supporting shaft for achieving the transmission of power.

With the aforementioned design, mutual interference between the first gears 321 and the second gears 322 could be avoided by respectively arranging the first gears 321 and the second gears 322 on two opposite sides of the carrier 21 along the axis. Additionally, compared with the transmission system 1 of the conventional decelerating mechanism, which must reserve the gaps between several gears, the transmission system of the decelerating mechanism of the present disclosure only reserves the gap d1 between each of the first gears 321 and the first surface 211 and the gap d2 between each of the second gears 322 and the second surface 212, thereby the required length of the planetary shafts 221 in the axial direction could be greatly reduced, reducing the overall volume of the transmission system of the decelerating mechanism of the present disclosure, facilitating the space utilization within the casing, and improving the shaking and the deflection generated when the planetary gear unit 3 running.

It must be pointed out that the embodiments described above are only some embodiments of the present disclosure. All equivalent structures which employ the concepts disclosed in this specification and the appended claims should fall within the scope of the present disclosure.

What is claimed is:

1. A transmission system of a decelerating mechanism, comprising:
    a holder comprising a carrier surrounding an axis and a plurality of planetary shaft units penetrating through the carrier along an axial direction parallel to the axis to be rotatably disposed on the carrier, wherein the carrier has a first surface and a second surface that face opposite directions in the axis;
    a planetary gear unit comprising a sun gear and a planetary gear set, wherein the sun gear is adjacent to the first surface and is adapted to rotate around the axis; the planetary gear set has a plurality of first gears adjacent to the first surface and respectively fitting around the planetary shaft units to mesh with the sun gear, a plurality of second gears adjacent to the second surface and respectively fitting around the planetary shaft units to be respectively and correspondingly being coaxial with the plurality of first gears, and an internal gear ring surrounding the axis and meshing with the plurality of second gears; each of the plurality of first gears turns coaxial with one of the plurality of second gears, and the plurality of second gears drive the internal gear ring to turn;
    wherein the plurality of planetary shaft units are disposed on the carrier at regular intervals around the axis; each of the plurality of planetary shaft units has a planetary shaft, which penetrates through the carrier along the axial direction to be rotatably disposed on the carrier, and at least one planetary bearing fitting around the planetary shaft of each of the plurality of planetary shaft units and fitting into the carrier; two opposite ends of the planetary shaft of each of the plurality of planetary shaft units are respectively adapted to be fitted around by one of the plurality of first gears and one of the plurality of second gears;
    wherein the carrier has a plurality of through holes penetrating through both the first surface and the second surface along the axial direction and respectively adapted to be passed through by the plurality of planetary shaft units; each of the plurality of through holes is adapted to be fitted by the at least one planetary bearing of one of the plurality of planetary shaft units;
    wherein the at least one planetary bearing of each of the plurality of planetary shaft units includes two planetary bearings fitting around the corresponding planetary shaft and fitting into one of the plurality of through holes; the carrier has a plurality of annular ribs respectively protruding inward from an inner peripheral surface of the plurality of through holes; each of the plurality of annular ribs is adapted to separate the two planetary bearings disposed in the respective through hole.

2. A transmission system of a decelerating mechanism, comprising:
    a holder comprising a carrier surrounding an axis and a plurality of planetary shaft units penetrating through the carrier along an axial direction parallel to the axis to be rotatably disposed on the carrier, wherein the carrier has a first surface and a second surface that face opposite directions in the axis;
    a planetary gear unit comprising a sun gear and a planetary gear set, wherein the sun gear is adjacent to the first surface and is adapted to rotate around the axis; the planetary gear set has a plurality of first gears adjacent to the first surface and respectively fitting around the planetary shaft units to mesh with the sun gear, a plurality of second gears adjacent to the second surface and respectively fitting around the planetary shaft units to be respectively and correspondingly being coaxial with the plurality of first gears, and an internal gear ring surrounding the axis and meshing with the plurality of second gears; each of the plurality of first gears turns coaxial with one of the plurality of second gears, and the plurality of second gears drive the internal gear ring to turn;
    wherein the plurality of planetary shaft units are disposed on the carrier at regular intervals around the axis; each of the plurality of planetary shaft units has a planetary shaft, which penetrates through the carrier along the axial direction to be rotatably disposed on the carrier, and at least one planetary bearing fitting around the planetary shaft of each of the plurality of planetary shaft units and fitting into the carrier; two opposite ends of the planetary shaft of each of the plurality of planetary shaft units are respectively adapted to be fitted around by one of the plurality of first gears and one of the plurality of second gears;
    wherein each of the plurality of second gears is formed on the planetary shaft of one of the plurality of planetary shaft units by overmolding; an end of the planetary shaft of each of the plurality of planetary shaft units that is connected to one of the plurality of first gears has a restricting portion that is D-shaped; each of the plurality of first gears has a restricting hole that is D-shaped and corresponds to the restricting portion of the planetary shaft of one of the plurality of planetary shaft units.

3. A transmission system of a decelerating mechanism, comprising:
    a holder comprising a carrier surrounding an axis and a plurality of planetary shaft units penetrating through the carrier along an axial direction parallel to the axis to be rotatably disposed on the carrier, wherein the carrier has a first surface and a second surface that face opposite directions in the axis;
    a planetary gear unit comprising a sun gear and a planetary gear set, wherein the sun gear is adjacent to the first surface and is adapted to rotate around the axis; the planetary gear set has a plurality of first gears adjacent to the first surface and respectively fitting around the planetary shaft units to mesh with the sun gear, a plurality of second gears adjacent to the second surface and respectively fitting around the planetary shaft units to be respectively and correspondingly being coaxial with the plurality of first gears, and an internal gear ring surrounding the axis and meshing with the plurality of second gears; each of the plurality of first gears turns coaxial with one of the plurality of second gears, and the plurality of second gears drive the internal gear ring to turn;

wherein the carrier is annular; the holder comprises an one-way bearing ring connected to and abutting against an inner peripheral surface of the carrier and a sleeve abutting against an inner peripheral surface of the one-way bearing ring.

\* \* \* \* \*